Nov. 1, 1932.                J. A. ARENZ                 1,885,792
        MACHINE FOR CUTTING DOUBLE THREAD, SINGLE POINT SCREWS
                 Filed Jan. 24, 1931        3 Sheets-Sheet 1
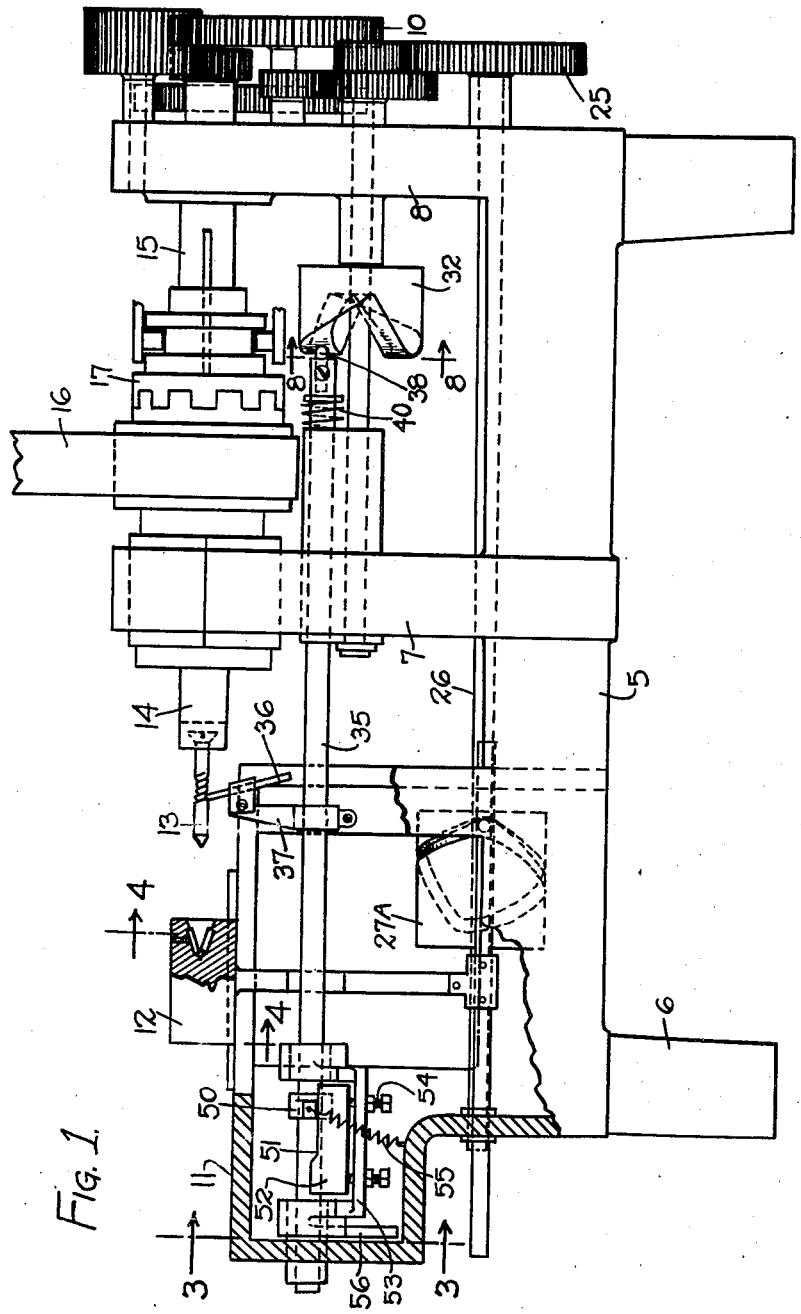
INVENTOR
JOHN A. ARENZ
BY HIS ATTORNEY Nov. 1, 1932.   J. A. ARENZ   1,885,792
MACHINE FOR CUTTING DOUBLE THREAD, SINGLE POINT SCREWS
Filed Jan. 24, 1931   3 Sheets-Sheet 2
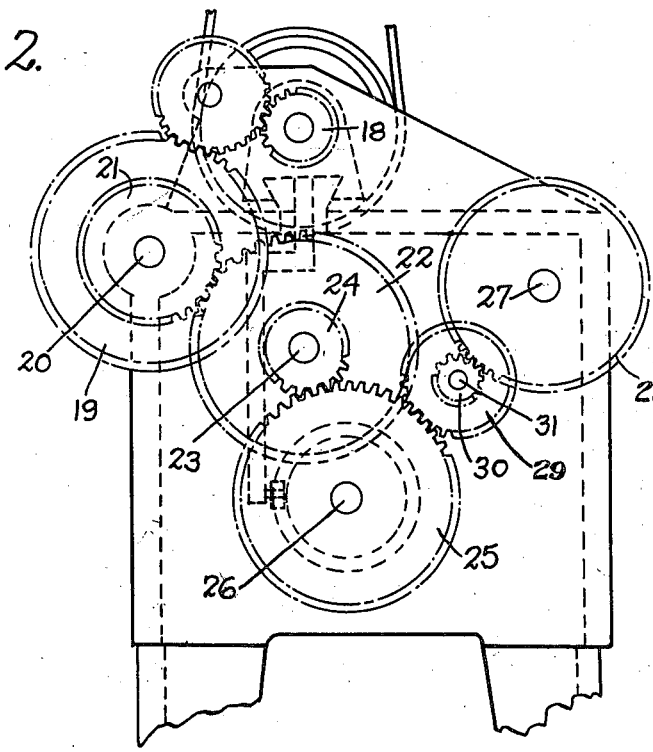
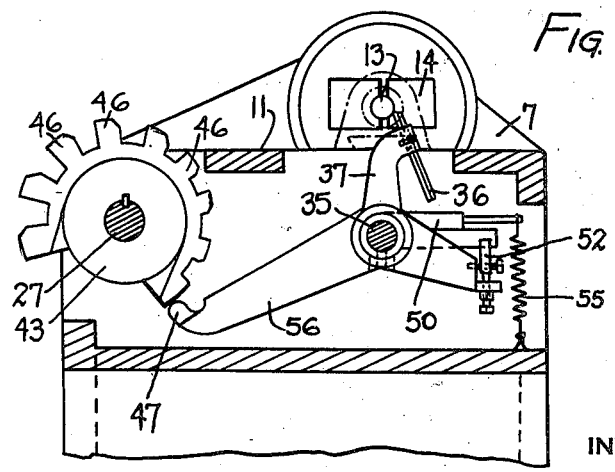
INVENTOR
JOHN A. ARENZ
BY HIS ATTORNEY Nov. 1, 1932.     J. A. ARENZ     1,885,792
MACHINE FOR CUTTING DOUBLE THREAD, SINGLE POINT SCREWS
Filed Jan. 24, 1931     3 Sheets-Sheet 3
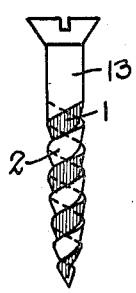
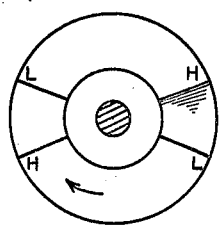
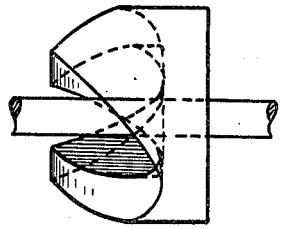
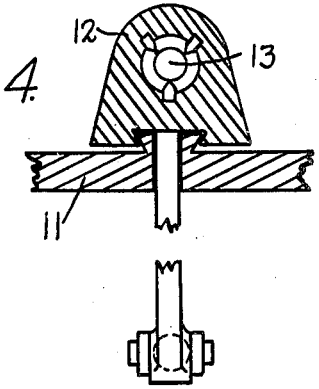
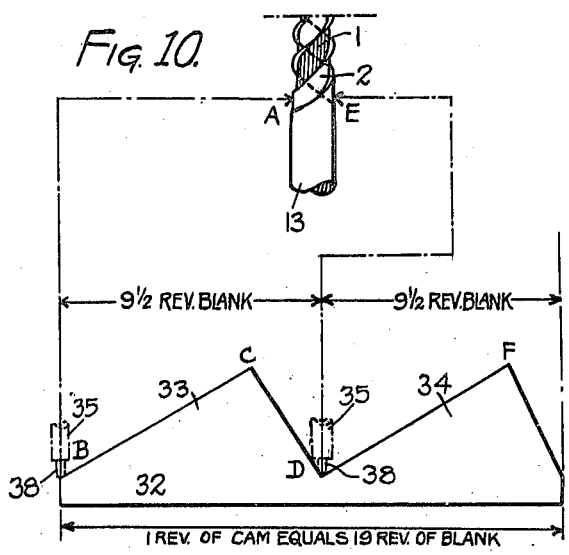
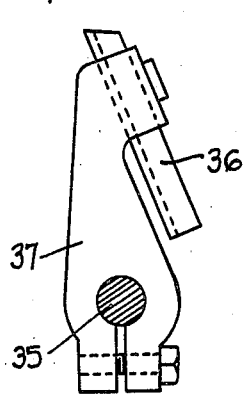
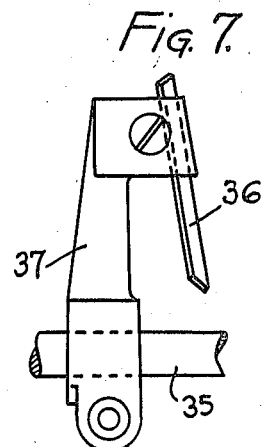
INVENTOR
JOHN A. ARENZ
BY HIS ATTORNEY Patented Nov. 1, 1932

1,885,792

UNITED STATES PATENT OFFICE

JOHN A. ARENZ, OF MOUNT VERNON, NEW YORK, ASSIGNOR TO INTERNATIONAL SCREW COMPANY, OF WILMINGTON, DELAWARE, A CORPORATION OF DELAWARE

MACHINE FOR CUTTING DOUBLE THREAD, SINGLE POINT SCREWS

Application filed January 24, 1931. Serial No. 510,925.

This invention relates to screw cutting machines and in particular to a machine designed to cut on a screw blank, a double thread terminating in a single piercing point.

A particular object of my invention is to provide in a machine of the character referred to, means whereby a double thread may be efficiently and properly cut without the necessity of changing gears on the drive end of the machine to obtain a fraction of a revolution of the blank carrying spindle with respect to the number of revolutions made by the tool feed or pitch cam. In cutting a doubled thread, it is preferable, although not necessary, to commence the cutting of each individual thread at directly opposite sides of the screw blank and in order to do this with a reciprocating tool, it is necessary on alternate strokes of the tool to arrange for the positioning of the blank so that alternate strokes of the tool cutting every other thread, will commence to cut at opposite sides of the blank. A number of constructions have been employed to carry out this feature but they contemplate the use of a change gear on the drive end of the machine which it is desirable to eliminate in view of the expense attached to the replacement of gears and find adjustments necessary and proper proportioning of the gear teeth.

As a further and equally important object of my invention I can cut a single point screw of my invention I can cut a single point screw as covered by my Patent No. 1,651,796 and at the same time provide means for cutting the different threads to the proper depth and starting each thread, if desired, at opposite sides of the screw blank.

Changes and variations may be made in the construction shown and described without departing from the principles of the invention or sacrificing its chief advantages; hence such invention is not to be confined to the structures shown in the accompanying drawings:

Figure 1 is a view in side elevation of a machine constructed in accordance with my invention, parts thereof being shown in section to illustrate the construction.

Figure 2 is a view in elevation taken at the drive end of the machine illustrating the gear train necessary in driving the blank carrying spindle and pitch cam in direct ratio.

Figure 3 is a section taken on the line 3—3 of Figure 1 and illustrates the use of a new type depth cam which assists in the carrying out of my invention.

Figure 4 is a section taken on the line 4—4 of Figure 1 and shows the blank pointing means employed.

Figure 5 is a view in elevation of a single point, double thread screw in which the double threads begin at opposite sides of the blank, this type of screw being cut in my machine.

Figure 6 is a view in side elevation of a tool employed in the machine.

Figure 7 is a view in front elevation of the tools illustrated in Figure 6.

Figure 8 is an enlarged section taken on the line 8—8 of Figure 1, illustrating the relative locations of the rises or lobes and the dwell of the cam employed.

Figure 9 is an enlarged view in side elevation of the cam employed in my machine.

Figure 10 is a view showing the development of the cam illustrated in Figure 9, and Figure 11 is a view in elevation of the double thread single point screw which has been cut by the machine illustrated in Figure 1.

Referring to the drawings in detail, 5 indicates a machine frame embodying the legs 6 and uprights 7 and 8 the latter two providing journals for the various shafts and studs necessary to the support of the gear train 10 employed at the drive end of the machine.

One end of the machine is provided with a housing 11 upon which is mounted for sliding movement, a blank pointing tool 12 which reciprocates back and forth at proper time intervals to point the screw blank 13 which is held in the chuck 14, revolved by the blank spindle 15. This blank spindle is driven by the belt 16 from any suitable source of power, the drive being controlled through the medium of a clutch 17 operated in any well known manner. The end of the blank spindle 15 beyond the upright 8 carries the drive pinion 18 which meshes with the intermediate gear 19 on the stud 20 to drive the gear 21 also secured to said stud. This gear 21 drives the gear 22 which operates the variable pitch or tool feed cam shaft 23. The shaft also carries the pinion 24 which meshes with and drives the pointer cam shaft gear 25 which operates the shaft 26 upon which is mounted the blank pointing cam 27A.

The depth cam shaft 27 is not illustrated in Figure 1 but is shown in Figure 3 and this shaft 27, supported in a part of the machine frame is driven by the gear 28 secured thereto, the gear being driven by an intermediate pinion 29 which takes its power from the gears 25, a suitable pinion 30 being employed on the stud shaft 31 on which the gear 29 is mounted to transfer the drive from the gear 29 to the gear 28.

There are two new features in respect to my invention and in order to cut a double thread, each of the threads being designated as 1 and 2, see Figure 11, it is necessary to provide means whereby a single tool will cut these threads alternately to form the completed screw and will cut them accurately starting at the same point each alternate time but at opposite sides of the blank. In order to carry out this feature of my invention, I have provided a special cam 32 as illustrated in Figures 1, 8 and 9 cut to provide two rising portions 33 and 34, the rising portions or lobes being arranged to move the tool shaft 35 longitudinally the same distance so that the tool 36 carried in the tool holder 37 secured to the shaft 35, will cut a double thread on the blank 13.

In order to understand the operation of my machine, it is noted that a blank 13 is positioned in the chuck 14 of the machine in any suitable automatic fashion and the pointer 12 operates to point the blank. The operation of the pointing cam 27A is in unison with the rest of the mechanism and properly timed and revolving movement of the cam 32 will reciprocate the tool 36 to form the threads. The shaft 35 has secured thereto, an extension 50, see Figure 1, which rests on a profile cam 51 having a high portion 52 which directs the tool inwardly along the pointed end of the blank to complete a threading operation.

This cam 51 is adjustably mounted in a suitable holder 53 and adjustably secured therein through the medium of the bolts 54. A spring 55 is employed to maintain the extension 50 against the profile cam 51.

The cam holder 53 is provided with the cam arm 56, the end 47 of which engages the depth cam 43, the operation of the cam being such that the cam 52 is elevated by each tooth 46 for each succeeding cut of the tool with the result that the shaft 35 is revolved slightly to throw the tool 36 toward the blank 13, thereby providing for the depth of the thread.

The rises or lobes 33 and 34 of the cam 32 are equal in height so that the tool 36 is given a reciprocating movement of the same length at each stroke of the tool shaft 35. Heretofore, use has been made of special timing gearing for the purpose of imparting to the blank a complete number of revolutions plus a fractional part of a revolution in order to bring the tool 36 on alternate revolutions of the cam, back to the same starting point but at diametrically opposite sides of the screw blank which means that a multiplicity of gearing must be employed which must be constantly changed when different size screws are to be manufactured.

My invention contemplates the use of a single cam having the rises 33 and 34 of like height but so divided that one rise of the cam equals a number of complete revolutions of the blank and part of a revolution, this being true also of the other cam rise 34 which equals a complete number of revolutions of the blank and part of a revolution. The total revolutions of the blank are in direct ratio to the total number of revolutions of the cam. Reference is made to Figure 10 in which a double threaded blank 13 is shown, the view being diagrammatic to illustrate the position of the tool. A tool is at A when the follower 38 is at B on the cam rise 33. Revolving movement of the cam 32 brings the high point C of the rise 33 beneath the follower 38 at which time the tool 36 has travelled its full forward stroke and is returned to position D through the medium of the springs 40 surrounding the shaft 35, (see Figure 1). The distance of the cam between B and D represents 9 and one-half revolutions of the blank, as an example, which means that one-half a revolution of the cam equals 9 and $\frac{1}{2}$ revolutions of the blank and when the follower 38 is at the point D, the extra one-half revolution that the blank has revolved, will bring the tool to the point E or diametrically opposite the point A on the screw blank 13, after which the cam continuing in its rotation will move the follower 38 to the point F and thence back to the starting point B making a total number of revolutions of the blank of 19 to one complete revolution of the blank with the result that the tool is again positioned at A. Alternate lobes of the cam will start a tool on the same point on the blank, and the other alternate lobe will start the tool at the diametrically opposite point on the blank without regard to the size of blank being threaded, the pitch or any other consideration, as long as the gears used on the drive end of the machine provide an odd number of turns on the blank to each revolution of the cam. In other words, the driving gears will turn the cam and the blank in direct ratio but always in terms of odd numbers of revolutions but these revolutions are complete, that is, the gearing is not adjusted to turn the screw blank a fraction of a turn with regard to a turn of the cam. As illustrated in Figure 10, the cam revolves once and the blank revolves 19 times but the cam could revolve once and the blank could revolve 21 times and the same result would be accomplished and without the necessity of cutting gears to rotate the blank an additional fraction of a complete revolution more than the revolutions of the cam.

It is to be noted at this point that a cam having a single lobe could not be employed to carry out my invention without the use of special gearing to provide the extra fraction of a turn of the screw blank because if a cam were employed having a single lobe, it would make no difference what the length of the lobe was if there was a direct ratio between the number of complete turns of the blank and the complete turns of the cam, the tool would always begin at the same point and of course, a double thread could not be cut.

My invention is directed particularly to the elimination of gears on the drive end of the machine that have to be changed in order to give a one-half additional rotation to the blank to a full rotation of the cam, inasmuch as it has been found that these gears are expensive, call for expert manipulation in screw plants when it is necessary to cut threads of different pitches or conditions under which the screw is to be manufactured.

It is evident, therefore, that I have provided an improved screw machine particularly adapted for turning out double threaded single pointed screws of the type referred to, which employs a double lobe cam, the sections of which are so arranged relatively to the diameter of the cam that operation of the threading tool is performed in the proper timed relation with the revolving movement of the screw blank to commence alternate cuttings by the tool at diametrically opposite sides of the blank to form thereon a double thread.

My improved machine is so geared that the blank spindle and the pitch cam shaft revolves in direct ratio and have no fractional differences of rotation which has been heretofore necessary in order to begin a cut at the diametrically opposite sides of the screw blank. The elimination of special gearing in connection with my improved screw machine obviates the use of expert operators in screw plants and eliminates adjustment for wear inasmuch as wear on my cam 32 is even and makes no difference relatively in the starting point or spacing of the double thread.

My invention is not to be restricted to the precise details of construction shown since various changes and modifications may be made therein without departing from the scope of the invention or sacrificing the advantages derived from its use.

What I claim is:—

In a screw machine, a blank revolving spindle, a thread cutting tool, a cam for moving the tool longitudinally equal work performing distances a plurality of times during a single cam revolution, a plurality of lobes of equal height on the cam having spaces of equal depth therebetween each lobe forming one-half the complete cam, means for operating said spindle and cam, and said means being arranged to turn the spindle an odd number of complete revolutions to each complete revolution of the cam.

In testimony whereof I affix my signature.
JOHN A. ARENZ.